(12) United States Patent
Pope

(10) Patent No.: US 6,926,293 B1
(45) Date of Patent: Aug. 9, 2005

(54) LOAD TRANSPORT ASSEMBLY

(76) Inventor: Jacquelyn S. Pope, 333 Arabian Dr., Pensacola, FL (US) 32506

( * ) Notice: Subject to any disclaimer, the term of this patent is extended or adjusted under 35 U.S.C. 154(b) by 0 days.

(21) Appl. No.: 10/794,274

(22) Filed: Mar. 8, 2004

(51) Int. Cl.$^7$ .............................................. B62B 5/00
(52) U.S. Cl. ................. 280/79.11; 280/47.34; 280/19
(58) Field of Search ........................... 280/14.27, 14.1, 280/13, 14.28, 15, 16, 18, 18.1, 19, 19.1, 280/22, 23.1, 28.12, 28.13, 28.5, 47.29, 47.41, 280/651, 79.11, 47.3

(56) References Cited

U.S. PATENT DOCUMENTS

| | | | | |
|---|---|---|---|---|
| 195,359 | A | * | 9/1877 | Gregg ........................... 280/19 |
| 533,981 | A | * | 2/1895 | Ballou .......................... 280/19 |
| 2,308,699 | A | * | 1/1943 | Longenecker ................. 280/19 |
| 2,424,694 | A | * | 7/1947 | Jones ........................... 280/19 |
| 3,012,794 | A | * | 12/1961 | Barbiaux ...................... 280/19 |
| 4,139,208 | A | | 2/1979 | Kaley et al. |
| 4,241,929 | A | * | 12/1980 | Curry ....................... 280/14.27 |
| 4,335,891 | A | * | 6/1982 | Alley et al. .................... 280/19 |
| 4,796,909 | A | | 1/1989 | Kirkendall |
| D317,734 | S | | 6/1991 | Cunha et al. |
| 5,092,615 | A | | 3/1992 | Gregalis |
| 5,106,109 | A | | 4/1992 | Tattersall et al. |
| 5,197,754 | A | | 3/1993 | Ward |
| 5,575,490 | A | * | 11/1996 | Simpson, Jr. ............. 280/28.12 |
| 5,620,191 | A | * | 4/1997 | Sayette ......................... 280/13 |
| 5,704,624 | A | * | 1/1998 | Davis ....................... 280/47.34 |
| 5,857,695 | A | | 1/1999 | Crowell |
| 5,921,635 | A | * | 7/1999 | Deliman et al. ............... 280/37 |
| 6,042,122 | A | | 3/2000 | Mohr |
| 6,257,599 | B1 | | 7/2001 | Johnson et al. |
| 6,357,824 | B1 | * | 3/2002 | Whitacre .................... 280/648 |
| 6,431,560 | B2 | * | 8/2002 | Cummings ............... 280/14.21 |
| 6,543,800 | B1 | * | 4/2003 | Doran ...................... 280/47.26 |
| 6,623,018 | B2 | * | 9/2003 | Fireman et al. ............... 280/18 |

* cited by examiner

Primary Examiner—Hau Phan

(57) ABSTRACT

A load transport assembly for transporting loads across a sand surface includes a panel that has a peripheral edge that includes a front end, a first side, a second side and a back end. A peripheral wall is attached to and extends upwardly from the peripheral edge. The first portion has an opening extending therethrough. A plurality of pegs is attached to an inner surface of the opening. An elongated flexible tether has a first end and a second end. A handle is attached to the first end. A coupler is attached to the second end. The coupler is selectively extended around the pegs such that the tether is attached to the panel.

8 Claims, 6 Drawing Sheets

LOAD TRANSPORT ASSEMBLY

BACKGROUND OF THE INVENTION

1. Field of the Invention

The present invention relates to load transport devices and more particularly pertains to a new load transport device for transporting heavy objects across a sand covered surface such as a beach.

2. Description of the Prior Art

The use of load transport devices is known in the prior art. U.S. Pat. No. 4,139,208 describes a device that includes a housing mounted on a pair of runners and having collapsible wheels mounted thereto for transporting goods over a variety of terrains. Another type of load transport device is U.S. Pat. No. 4,796,909 having a bed portion with axles thereon to which wheels are attached. The cart may be used for transporting loads over a ground surface that is fairly stable.

While these devices fulfill their respective, particular objectives and requirements, the need remains for a device that is well suited for pulling heavy items, such as coolers, over sand covered ground such as on a beach. The device should also include a way to transport the cooler over hard surfaces, such as concrete and asphalt, without damaging the device as it is moved over the hard surface. Such a device could also be used for holding other items that might be used on a beach and will make it easier for a person to travel across the sand.

SUMMARY OF THE INVENTION

The present invention meets the needs presented above by generally comprising a panel that has a peripheral edge that includes a front end, a first side, a second side and a back end. A peripheral wall is attached to and extends upwardly from the peripheral edge. The panel has a bend therein positioned nearer to the front end than the back end such that a first portion is defined between the bend and the front end and a second portion is defined between the bend and back end. The first portion is angled upwardly with respect to the second portion. The first portion has an opening extending therethrough. A plurality of pegs is attached to an inner surface of the opening. An elongated flexible tether has a first end and a second end. A handle is attached to the first end. A coupler is attached to the second end. The coupler is selectively extended around the pegs such that the tether is attached to the panel.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
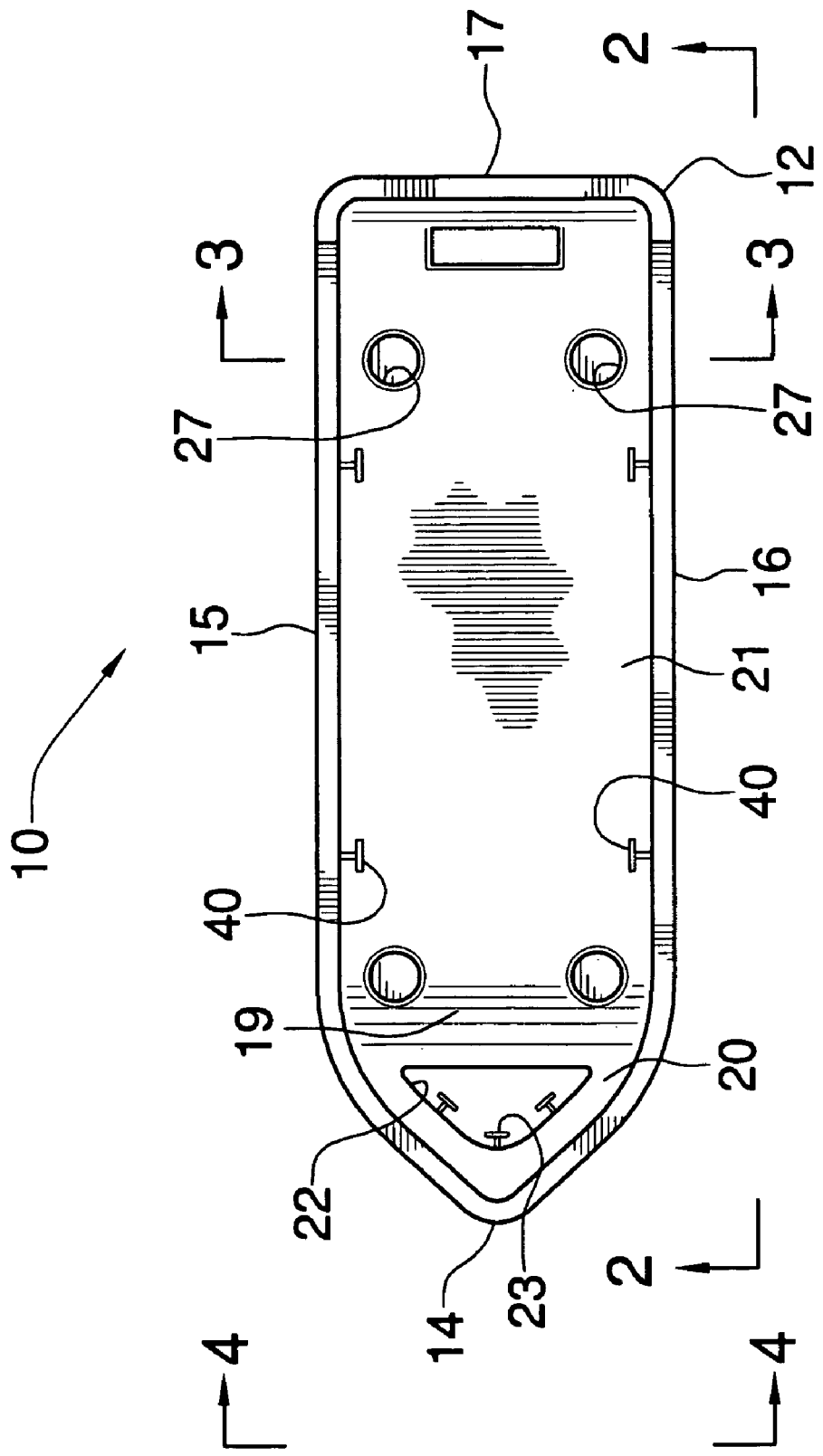
FIG. 1 is a top view of a load transport assembly according to the present invention.
Figure 2:
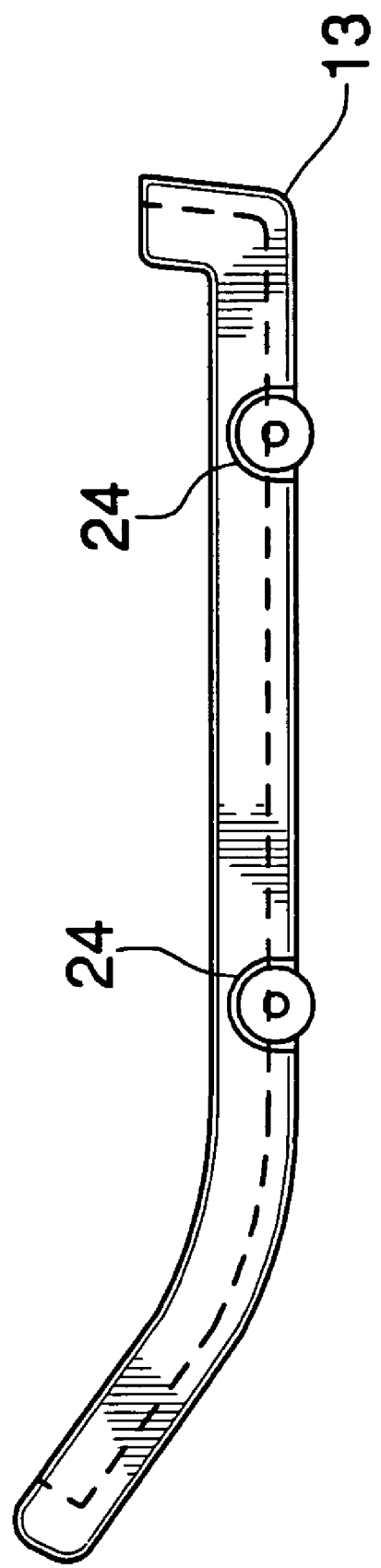
FIG. 2 is a side view of the present invention.
Figure 3:
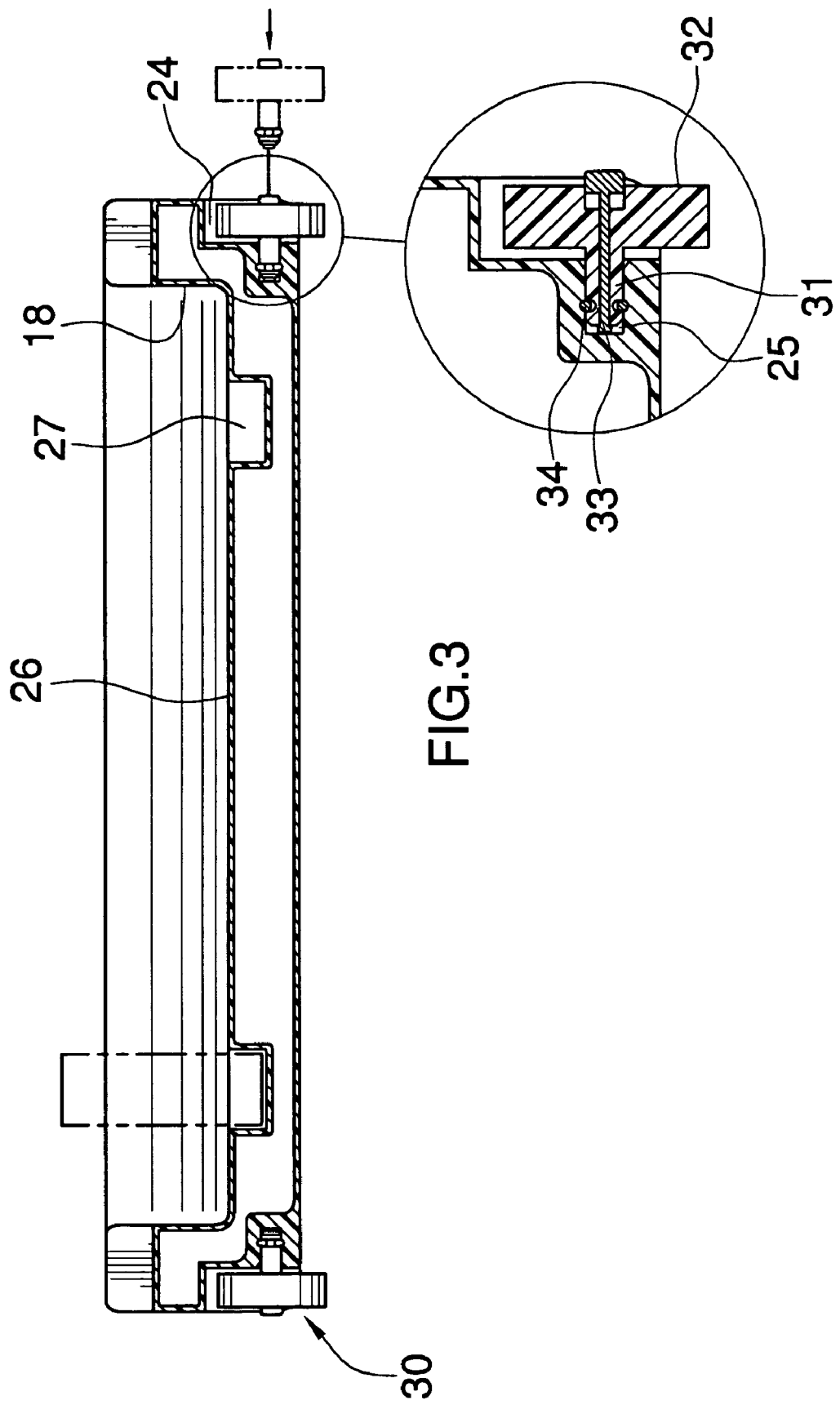
FIG. 3 is a cross-sectional view taken along line 3—3 of FIG. 2 of the present invention.
Figure 4:
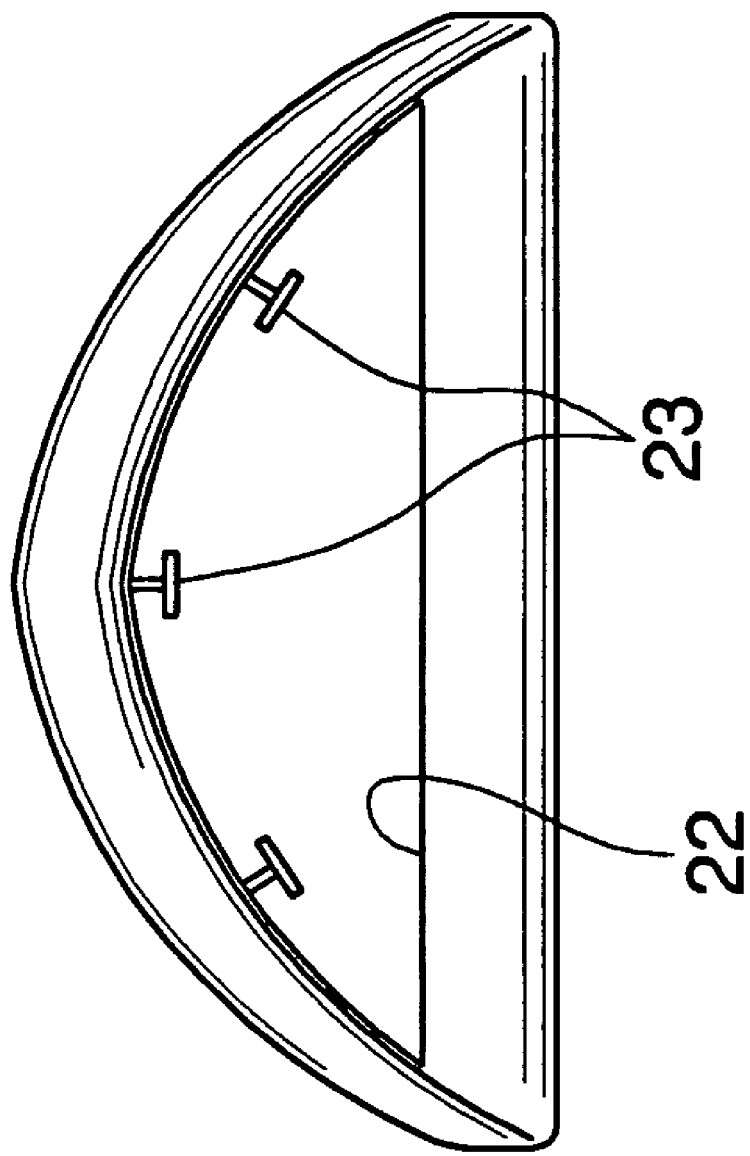
FIG. 4 is a front view of the present invention.
Figure 5:
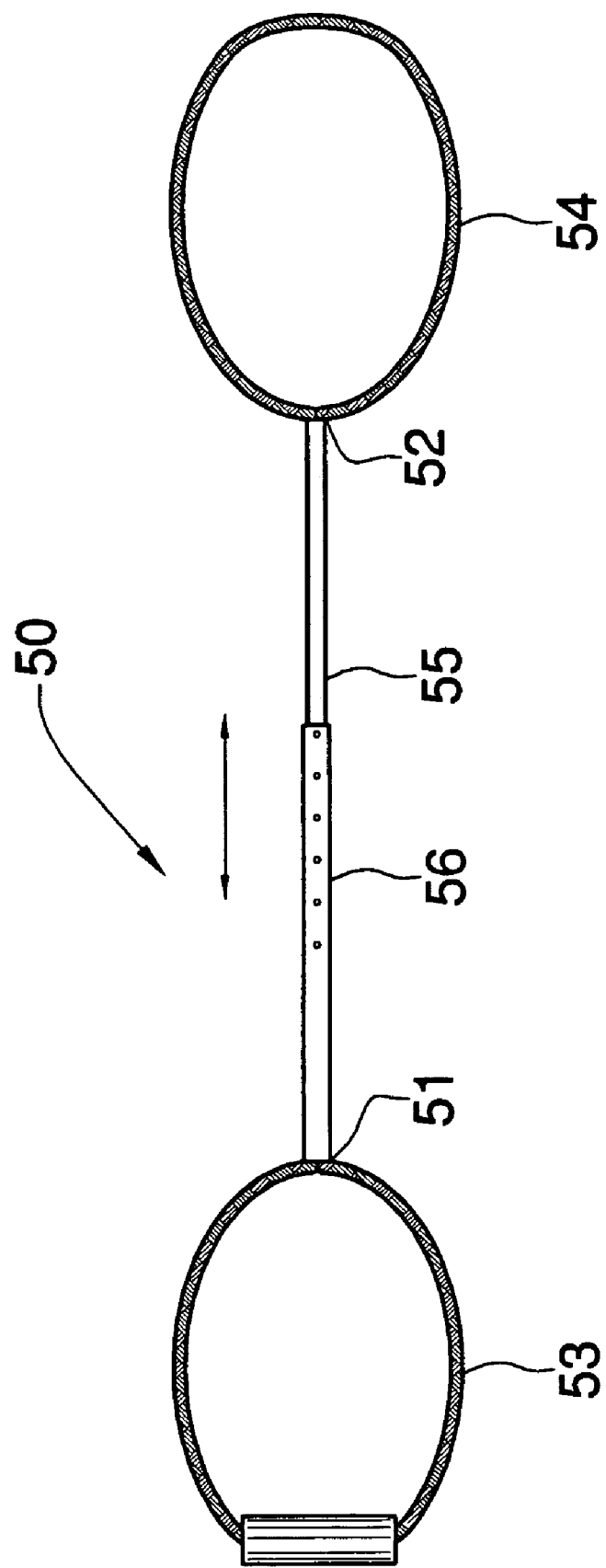
FIG. 5 is a side view of a tether of the present invention.
Figure 6:
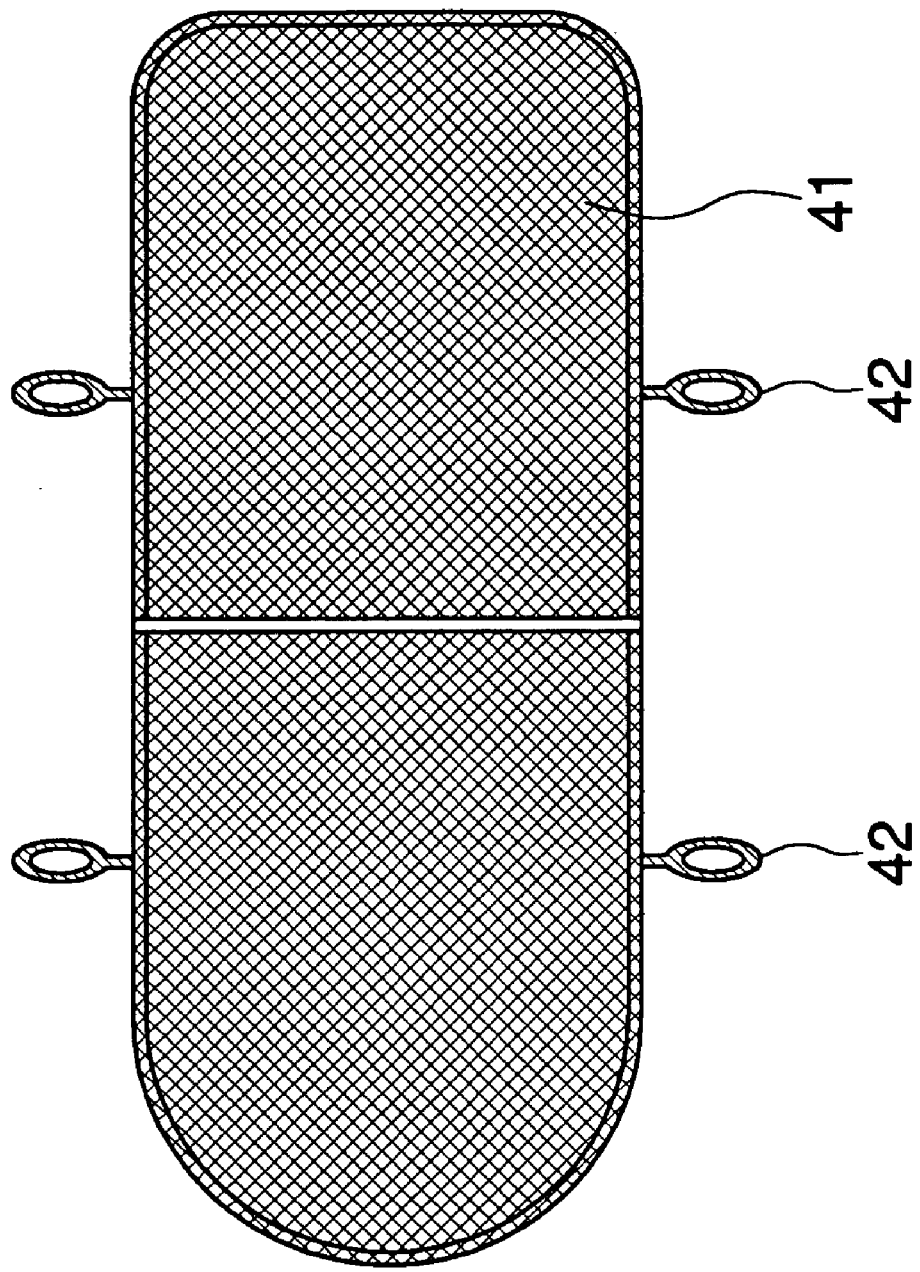
FIG. 6 is a top view of the netting of the present invention.

With reference now to the drawings, and in particular to FIGS. 1 through 6 thereof, a new load transport device embodying the principles and concepts of the present invention and generally designated by the reference numeral 10 will be described.

As best illustrated in FIGS. 1 through 6, the load transport assembly 10 generally comprises a panel 12 has a peripheral edge 13 that includes a front end 14, a first side 15, a second side 16 and a back end 17. The panel 12 is preferably between 25 inches and 30 inches wide and 35 inches and 40 inches long. A peripheral wall 18 is attached to and extends upwardly from the peripheral edge 13. The peripheral wall 18 is preferably about 6 inches tall. The front end 14 is preferably pointed. The panel 12 has a bend 19 therein positioned nearer to the front end 14 than the back end 17 such that a first portion 20 is defined between the bend 19 and the front end 14 and a second portion 21 is defined between the bend 19 and back end 17. The first portion 20 is angled upwardly with respect to the second portion 21 at an angle generally between 15 degrees and 45 degrees. The first portion 20 has an opening 22 extending therethrough and a plurality of pegs 23 is attached to an inner surface of the opening 22. Each of the first 15 and second 16 side edges has a pair of spaced wheel wells 24 therein. Each of the wells 24 has an inner wall having an aperture 25 extending therein. A top side 26 of the second portion 21 has a plurality of circular depressions 27 therein. Each of the depressions 27 has a diameter generally between 2½ inches and 3 inches. The depressions 27 are adapted for holding soda cans and the like.

Each of a plurality of wheel assemblies 30 is removably attached to the panel 12. Each of the wheel assemblies 30 includes a post 31 that is removably extendable into one of the apertures 25 such that the post 31 is releasably secured within the aperture 25. Each of the wheel assemblies includes a wheel 32. Each of the wheels 32 is rotatably coupled to one of the posts 31. The posts 31 may selectively be used for securing the wheels 32 in one of the wheel wells 24 such that the wheels 32 extend downwardly from the panel 12. The wheels 32 each preferably have a height between about 5 inches and 6 inches. The posts 31 include peripheral notches 33 that receive ridges 34 in the walls of the apertures 25. Alternatively, a button mechanism may be included that engages the posts 31 to eject the posts 31 from the apertures 25 when desired.

Each of a plurality of rods 40 is attached to the peripheral wall 18. Each of the rods 40 extends inward such that each of the rods 40 extends over the panel 12. At least two of the rods 40 are positioned adjacent to the first side 15 and at least two of the rods 40 are positioned adjacent to the second side 16. A netting 41 has a perimeter edge that has a plurality of loop members 42 attached thereto. Each of the loop members 42 is removably attached to one of the rods 40 such that the netting 41 extends over the panel 12.

An elongated flexible tether 50 has a first end 51 and a second end 52. A handle 53 is attached to the first end 51. A coupler 54 is attached to the second end 52. The coupler 54 is selectively extended around the pegs 23 such that the tether 50 is attached to the panel 12. The coupler 54 includes loop that is extendable through the opening 22 and around the pegs 23. The tether 50 preferably has a length generally between 3 feet and 5 feet. If the tether 50 is too long, the front end 14 will dip into sand as it is being pulled forward. A shorter tether 50 causes the person pulling the panel 12 to pull upwardly on it as well to ensure it remains out of the sand. The tether 50 may be selectively telescoping and include a first section 55 removably extended into a second section 56. Alternatively, the tether 50 may include a rope or cord that may be selectively drawn into or removed from a winding assembly. Also, if the tether 50 is a rope, it may be wrapped around the pegs 23 to shorten its length. Additional ropes may be attached to the pegs 23 so that multiple persons can pull the panel 12.

In use, coolers and other items typically used while at the beach. The netting 41 is positioned over the items and secured thereto by attaching the netting 41 to the rods 40. The tether 50 is attached to the panel 12 so that it may be dragged across the ground surface, and in particular across the sand. For hard surfaces, the wheel assemblies 30 can be attached to the panel 12 so that the panel 12 rolls across the surface.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A transportation assembly for transporting a load on sand and hard surfaces, said assembly comprising:
   a panel having a peripheral edge that includes a front end, a first side, a second side and a back end, a peripheral wall being attached to and extending upwardly from said peripheral edge, said panel having a bend therein positioned nearer to said front end than said back end such that a first portion is defined between said bend and said front end and a second portion is defined between said bend and back end, said first portion having an opening extending therethrough, a plurality of pegs being attached to an inner surface of said opening, said first portion being angled upwardly with respect to said second portion; and
   an elongated flexible tether having a first end and a second end, a handle being attached to said first end, a coupler being attached to said second end, said coupler being selectively extended around said pegs such that said tether is attached to said panel.

2. The assembly according to claim 1, further including a plurality of wheel assemblies, each of said wheel assemblies being removably attached to said panel.

3. The assembly according to claim 1, wherein a top side of said second portion having a plurality of circular depressions therein, each of said depressions having a diameter generally between 2½ inches and 3 inches.

4. The assembly according to claim 1, further including:
   each of said first and second side edges having a pair of spaced wheel wells therein, each of said wells having an inner wall having an aperture extending therein;
   a plurality of wheel assemblies, each of said wheel assemblies being removably attached to said panel, each of said wheel assemblies including:
      a post being removably extendable into one of said apertures such that said post is releasably secured within said aperture; and
      a wheel being rotatably coupled to said post, wherein said post may selectively be used for securing said wheel in one of said wheel wells such that said wheel extends downwardly from said panel.

5. The assembly according to claim 4, further including a plurality of rods being attached to said peripheral wall, each of said rods extending inward such that each of said rods extends over said panel, at least two of said rods being positioned adjacent to said first side and at least two of said rods being positioned adjacent to said second side, a netting having a perimeter edge having a plurality of loop members attached thereto, each of said loop members being removably attached to one of said rods such that said netting extends over said panel.

6. The assembly according to claim 1, further including a plurality of rods being attached to said peripheral wall, each of said rods extending inward such that each of said rods extends over said panel, at least two of said rods being positioned adjacent to said first side and at least two of said rods being positioned adjacent to said second side, a netting having a perimeter edge having a plurality of loop members attached thereto, each of said loop members being removably attached to one of said rods such that said netting extends over said panel.

7. The assembly according to claim 1, wherein said tether is selectively telescoping.

8. A transportation assembly for transporting a load on sand and hard surfaces, said assembly comprising:
   a panel having a peripheral edge that includes a front end, a first side, a second side and a back end, a peripheral wall being attached to and extending upwardly from said peripheral edge, said front end being pointed, said panel having a bend therein positioned nearer to said front end than said back end such that a first portion is defined between said bend and said front end and a second portion is defined between said bend and back end, said first portion having an opening extending therethrough, a plurality of pegs being attached to an inner surface of said opening, said first portion being angled upwardly with respect to said second portion, each of said first and second side edges having a pair of spaced wheel wells therein, each of said wells having an inner wall having an aperture extending therein, a top side of said second portion having a plurality of circular depressions therein, each of said depressions having a diameter generally between 2½ inches and 3 inches;
   a plurality of wheel assemblies, each of said wheel assemblies being removably attached to said panel, each of said wheel assemblies including:
      a post being removably extendable into one of said apertures such that said post is releasably secured within said aperture;
      a wheel being rotatably coupled to said post, wherein said post may selectively be used for securing said wheel in one of said wheel wells such that said wheel extends downwardly from said panel;

a plurality of rods being attached to said peripheral wall, each of said rods extending inward such that each of said rods extends over said panel, at least two of said rods being positioned adjacent to said first side and at least two of said rods being positioned adjacent to said second side;

an elongated flexible tether having a first end and a second end, a handle being attached to said first end, a coupler being attached to said second end, said coupler being selectively extended around said pegs such that said tether is attached to said panel, said tether being selectively telescoping; and a netting having a perimeter edge having a plurality of loop members attached thereto, each of said loop members being removably attached to one of said rods such that said netting extends over said panel.

\* \* \* \* \*